United States Patent
Tsai et al.

(10) Patent No.: US 9,798,078 B2
(45) Date of Patent: Oct. 24, 2017

(54) TEMPERATURE COMPENSATED FIBER BRAGG'S GRATING FILTER

(71) Applicant: JINN HER ENTERPRISE CO., LTD., Kaohsiung (TW)

(72) Inventors: Yung-Yu Tsai, Kaohsiung (TW); Chun-Chu Yang, Kaohsiung (TW)

(73) Assignee: JINN HER ENTERPRISE CO., LTD., Kaohsiung (TW)

( * ) Notice: Subject to any disclaimer, the term of this patent is extended or adjusted under 35 U.S.C. 154(b) by 0 days.

(21) Appl. No.: 15/141,540

(22) Filed: Apr. 28, 2016

(65) Prior Publication Data

US 2016/0320555 A1 Nov. 3, 2016

(30) Foreign Application Priority Data

Apr. 30, 2015 (TW) .............................. 104113855 A (51) Int. Cl.
*G02B 6/02* (2006.01)

(52) U.S. Cl.
CPC .................................. *G02B 6/0218* (2013.01)

(58) Field of Classification Search
CPC .................................................. G02B 6/0218
See application file for complete search history.

(56) References Cited

U.S. PATENT DOCUMENTS

| 5,042,898 | A | 8/1991 | Morey et al. |
| 6,493,486 | B1 | 12/2002 | Chen |
| 6,556,726 | B2 * | 4/2003 | Yang ...................... G02B 6/022 385/15 |
| 6,771,858 | B2 * | 8/2004 | Bourcier ............. G02B 6/0218 385/37 |
| 6,853,771 | B2 * | 2/2005 | Tsai ..................... G02B 6/0218 385/37 |
| 6,944,374 | B2 * | 9/2005 | Skull .................... G02B 6/0218 385/137 |
| 9,120,286 | B2 * | 9/2015 | Dailey ...................... B32B 7/02 |

* cited by examiner

*Primary Examiner* — Daniel Petkovsek
(74) *Attorney, Agent, or Firm* — Muncy, Geissler, Olds & Lowe, P.C.

(57) ABSTRACT

The present invention provides a filter composed of two layers of materials with different expansion coefficients. The difference between a length added to a whole section length of an outer low-expansion coefficient metal sleeve by a temperature change and a length added to a length of a whole section of high-expansion coefficient cylindrical coil spring arranged therein by the temperature change causes a stress-releasing or stress-increasing effect on the whole section of pre-tensioned high-expansion coefficient cylindrical coil spring arranged therein, so that a structure capable of compensating the wavelength shift of the fiber Bragg's grating filter caused by temperature by increasing or decreasing the refractive index is achieved.

8 Claims, 4 Drawing Sheets

TEMPERATURE COMPENSATED FIBER BRAGG'S GRATING FILTER

FIELD OF THE INVENTION

The present invention relates to a wavelength filter device, particularly to a precision wavelength filter device whose fiber Bragg grating is jacketed and pre-stressed by springs to achieve a thermal-compensated function.

BACKGROUND OF THE INVENTION

In the prior art, a fiber Bragg's grating (referred to as FBG hereinafter) is formed by an optical fiber to serve an optical fiber filtration function. The FBG can reflect the wavelength as reception of light waves according to a default Bragg's feedback wavelength $\lambda_B$ engendered by a default grating period $\Lambda$ of the fiber grating, serving as an accurate filtration device for optical fiber communication. In an FBG by using a feedback effect generated Bragg diffraction, a predetermined wavelength satisfying a Bragg condition, referred to as a feedback Bragg wavelength $\lambda_B$, is reflected in a direction reverse to the incident direction back to a scanning apparatus that emits light waves for further analysis, so as to measure whether a received wavelength is increased or decreased; or the reflected wavelength is split to enter a communication receiving device, so as to detect the modulated carrier signal content in the preset received wavelength. The feedback Bragg wavelength 4 is represented by the following equation:

$$\lambda_B = 2n\Lambda \quad (1)$$

In equation (1), $\Lambda$ is the period of the FBG and n is an effective refractive index of the optical fiber. The wavelength value of the feedback Bragg wavelength $\lambda_B$ can change as the refractive index n of a core material of the optical fiber increases or decreases due to a change in temperature or the interval of $\Lambda$ is changed due to force received by the fiber grating.

When temperature does not change and the FBG is used as a strain measurement function, a variance in the original interval of $\Lambda$ which is caused by the strain generated in the fiber grating by an external force received is $\Delta\Lambda$, which is substituted into equation (1) to obtain $$\Delta\lambda_B = 2n\Delta\Lambda \quad (2)$$

According to the definition of strain $\epsilon$, the gauge length of the force receiving object is set to 1, and $\Delta$1 is the length change due to the force received $$\epsilon = \Delta 1/1 = \Delta\Lambda/\Lambda \quad (3)$$

It is then obtained that:

$$\Delta 1 = (\Delta\Lambda/\Lambda)1 = ((\Delta\lambda_B/2n)/(\lambda_B/2n))1,$$

Therefore:

$$\epsilon = \Delta 1/1 = \Delta\lambda_B/\lambda_B \quad (4)$$

What is mentioned above is the calculation formula which is used to measure a strain value of a structure to which the FBG attached usually with the preset wavelength variance ratio, i.e. $\Delta\lambda_B/\lambda_B$, under the assumption of the refractive index n being a fixed value when temperature does not change.

However, when temperature changes, the measurement of the ratio of a wavelength variance $\Delta\lambda_B$ to a variance in the original preset Bragg feedback wavelength $\lambda_B$ is usually represented by the following equation:

$$\Delta\lambda_B/\lambda_B = (1-P_e)\Delta\epsilon + (\alpha_f + \xi)\Delta T \quad (5)$$

$P_e$ is an effective photo-elastic effect value, $\alpha_f$ is a thermal expansion coefficient, and $\xi$ is a thermal-optic coefficient of a fused silica fiber. $\Delta\lambda_B$ is a variance in the feedback wavelength of the FBG caused by temperature, $\Delta\epsilon$ is a strain variance from the axial direction of the grating caused by temperature change, and $\Delta T$ is a temperature variation.

In fact, as the density of glass molecules in a light guide core of the optical fiber changes due to temperature change, the refractive index n changes; and as a result, even though the FBG does not receive any force, the original preset Bragg feedback wavelength $\lambda_B$ will still shift. For the requirement on the correctness of point-to-point fixed wavelength communication in optical fiber communication, this often results in the consequence of information missing, so it must be improved. The circuit cost for maintaining constant temperature in any communication use environment to keep the refractive index in the FBG unchanged is too high, so the principle of the natural physical technology and a method with the lowest cost must be utilized to compensate the shift of a fixed communication wavelength $\lambda$ caused by temperature.

Figure 1:
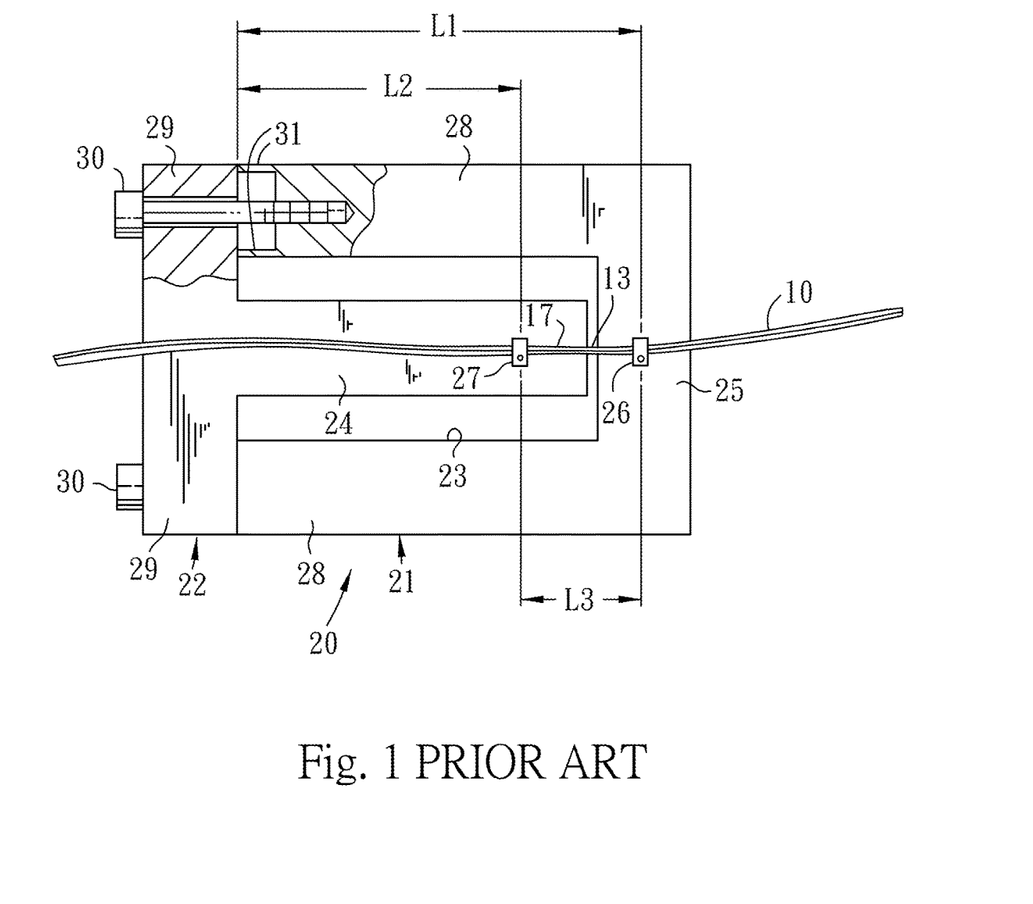
FIG. 1 is a sectional view of a device in prior U.S. Pat. No. 5,042,898.
Figure 2:
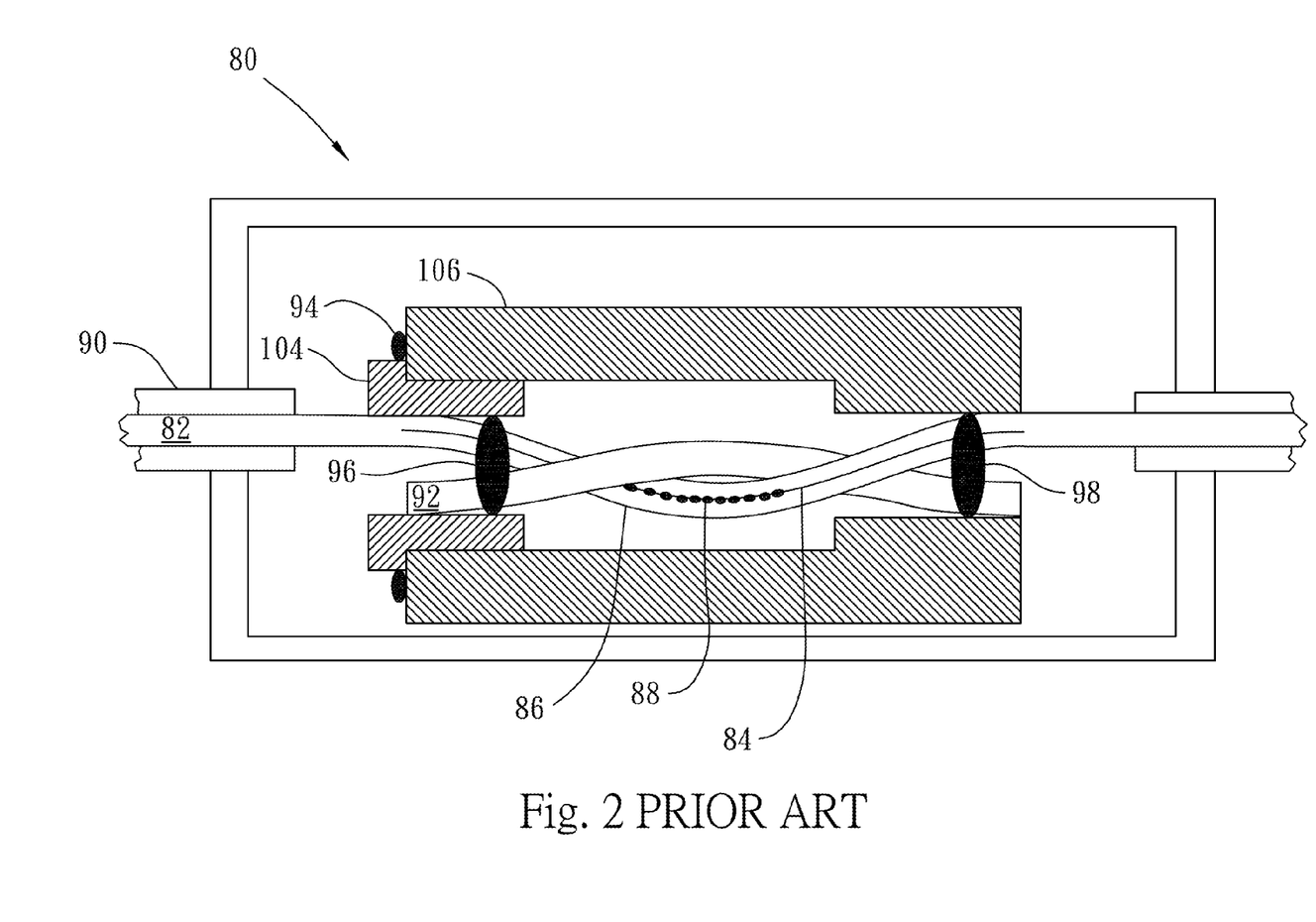
FIG. 2 is a sectional view of a device in prior U.S. Pat. No. 6,493,486.

The temperature compensation technology for the wavelength shift of the Bragg feedback wavelength $\lambda_B$ caused by temperature change in the prior art has been achieved by structures, such as devices (shown in FIG. 3 and FIG. 4 in the content) disclosed in "Incorporated Bragg Filter Temperature Compensated Optical Waveguide Device" of U.S. Pat. No. 5,042,898 by Morey, et al. as well as devices (shown in FIGS. 6-8 in the content), and conventional technologies (shown in FIGS. 3-5 in the content), disclosed in "Thermal compensated compact Bragg gating filter" of U.S. Pat. No. 6,493,486 by Chen in Finisar Corporation. Most of the above-mentioned various devices or structures adopt two types of metal materials with different expansion coefficients to form various structures with different geometrical shapes, such as a double-metal strip, C-shape clamp or axial rod-shaped structure; and when a cold and hot temperature change causes the physical length difference of such a structure, the FBG in the structure is forced to generate a variance $\Delta\Lambda$ in the grating period due to effects such as stretching or contraction under axial force, stretching or contraction caused by bending under lateral force or stretching or contraction under torsional force. he purpose of deliberately applying the variance $\Delta\Lambda$ on the structure is to reversely compensate an increase or decrease in the physical length of the FBG caused by cold or heat, causing an effect of eliminating the variance $\Delta\Lambda$ in the original preset Bragg grating period.

The specification describes the device in U.S. Pat. No. 5,042,898 by Morey with FIG. 1 and the device in U.S. Pat. No. 6,493,486 by Chen with FIG. 2. FIG. 1 is a sectional view of the device in prior U.S. Pat. No. 5,042,898; in the figure, 20 is an optical fiber filter, 10 is an optical fiber which gets into and out of the fiber filter, 13 is a Bragg grating section, 17 is a section of the optical fiber filter 10 which gets into the optical fiber filter, 21 (28) is a first temperature compensated component, 22 (29) is a second temperature compensated component, 23 is a concave in the first temperature compensated component 21, 24 is a projection of the second temperature compensated component 22, 25 is a bridge for two sections 17 and 13 of the optical fiber connected between an entering end 26 of the optical fiber 10 and a fixing point 27 on the projection 24, 30 is an optical fiber-pretensioning component, and 31 is a restorable for applying pretensioning force. FIG. 2 in the description is a sectional view of prior U.S. Pat. No. 6,493,486, i.e. the device of the sectional view in FIG. 6 in U.S. Pat. No. 6,493,486 by Chen; in the figure, 80 is a temperature compensated Bragg grating filter, 82 is an optical fiber which gets into and out of the fiber filter, 90 is a plastic-jacketing of optical fiber, 84 is an axial optical fiber core, 86 is an optical fiber cladding, 88 is an fiber Bragg's grating section, 92 is an optical fiber component which is twisted with the optical fiber 82, 104 is a twist adjustment component, 106 is a temperature compensation component paired with the twist adjustment component 104, 96 is a fixed connection point for the twist adjustment component 104, 98 is a fixed connection point for adjusting the twist pitch along with the fixed connection point 96 in the temperature compensation component 106, and 94 is a fixed bonding point for the twist adjustment component 104 and the temperature-compensated component 106 paired therewith.

In fact, there is a proportional dependency relationship between the refractive index and the internal stress of the optical fiber. Therefore, when temperature rises, if stress or torsion is released, the refractive index can be decreased to compensate the shift of the wavelength of the grating filter caused by temperature. As shown in FIG. 1, the springs 31 in the optical fiber-pretensioning components 30 restorably apply force to pretension the fiber grating, i so that non-axial stress is generated in the fiber grating. When temperature increases to make the projection 24 made of a high-expansion coefficient material of the second temperature-compensated component 22 extend to release the stress of the FBG 13 of the optical fiber, i.e. release stress, the refractive index can be decreased to compensate the shift of the wavelength of the grating filter caused by temperature. As shown in FIG. 2, the springs 31 in the optical fiber-pretensioning components 30 restorably apply force to pretension the fiber grating, so that non-axial stress is generated in the fiber grating. When temperature increases to make the fiber grating section 88 twisted by the high-expansion coefficient material 96 of the twist adjustment component 104 relieved so that the original torsion for twisting the FBG of the optical fiber is decreased, i.e., torsion is released, the refractive index can be decreased to compensate the shift of the wavelength of the grating filter caused by temperature. The abovementioned technical structures of the prior inventions also makes full use of equation (5) to keep $\Delta\lambda_B$ unchanged, i.e., $\Delta\lambda B=0$ leads to the left expression $\Delta\lambda_\beta/\lambda_\beta=0$; and consequently, even if temperature changes, the axial strain variance $\Delta\epsilon$ of the grating caused by temperature change $\Delta T$ is adjusted in inverse proportion. When temperature increases, stress or torsion is released; and when temperature decreases, stress or torsion is increased, so that $\Delta\lambda_\beta$ is equal to 0, achieving the objective of temperature compensation. Although the abovementioned mechanical structures methods for adjusting the FBG fiber grating in the prior art have made progress in gradually reducing size and reducing cost, when a preset central feedback wavelength of the FBG really needs to be chosen, besides the combination of components made of materials with different expansion coefficients, pretensioning force-applying component devices or components for twisting the FBG must also be produced, and as a result, the temperature compensated structure is enlarged. In particular, such a structure can be regarded as a very large structure for a thin optical fiber (for example, having an external diameter of 250 μm). Especially, distribution frames with very dense optical fibers in a telecommunication room cause space waste, so the size must be reduced in order to satisfy the demand on distribution frame spaces when "Fiber To The Home" is truly fully realized.

SUMMARY OF THE INVENTION

While a fiber Bragg's grating (FBG) is used for filtration and sensing, its normal operating temperature range must be determined first. Technically, when the FBG is installed at ambient temperature, usually, the amount of compression of the FBG under a lowest-temperature operating condition must be reserved first, so that the FBG can meet the contraction of a linear elastic region of an optical fiber material as operating environment temperature decreases, or the stretching of the linear elastic region of the optical fiber material as temperature increases. Otherwise, the FBG, which is not pre-tensioned cannot be in a linear proportional relation as temperature changes, may easily generate strain hysteresis and lose its accuracy when really operating at the lowest temperature. The preloading of the FBG is often implemented as pre-tensioning, pre-bending or pre-twisting and called optical fiber pre-tensioning in the prior art, which has been described in the aforementioned prior art, and the defect of its large size has be described. Therefore, during implementation, while the FBG is first pretensioned to the predetermined operating central wavelength, a result of reserving the amount of compression of the FBG under the lowest-temperature operating condition is also achieved, and a stress or torsion has been stored in the FBG itself. According to equation (5) and the content described above, for the stored stress or torsion, a starting point which can serve as a temperature compensation function has been reserved. The temperature compensated function can be achieved as long as a pair of suitable optional high-expansion and low-expansion coefficient materials are provided or a structure which can relieve the FBG as temperature increases is produced.

Figure 3:
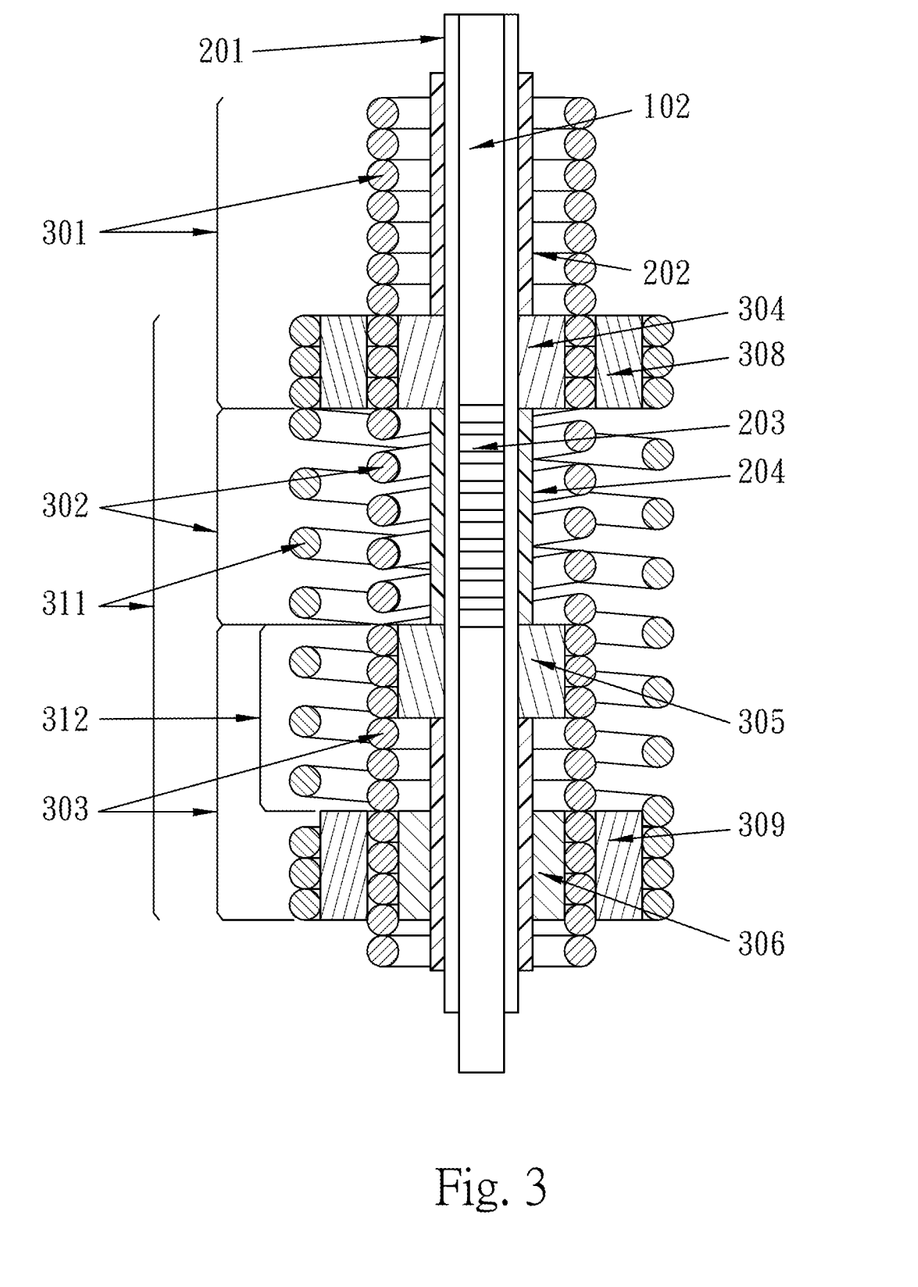
FIG. 3 is a longitudinal sectional view of the loose-jacketing second low-expansion coefficient spring coiled in a different direction.

In a concentric combination manner, the present invention first sleeves (or called loosely jacket; a coating method with a uniform gap and without axial optical fiber frictional resistance) the periphery of a fiber Bragg's grating with a first high-expansion coefficient spring, and then loosely jackets the first spring with a second low-expansion coefficient spring coiled in a different direction, and thereby the structure of a temperature compensated light wavelength filter is formed, as shown in FIG. 3. FIG. 3 is a longitudinal sectional view of the loosely-jacketing second low-expansion coefficient spring coiled in a different direction. In FIG. 3, 102 is an optical fiber core, 201 is a 125 μm bare optical fiber, 202 is a 250 μm outside diameter resin jacketing protection layer, 203 is a 125 μm optical fiber core grating region, 204 is a 250 μm outside diameter resin re jacketing protection layer, and 301 is an external jacketing upper-section cylindrical tension coil spring with a 0.9 mm outside diameter; the purpose of adopting the 0.9 mm outside diameter cylindrical tension coil spring is to make for the same-outside diameter butting with external optical fiber jacketing materials commercially used in a large quantity (similarly hereinafter), such as PE; 302 is an external-jacketing high-expansion coefficient cylindrical compression coil spring of a 0.9 mm outside diameter, 303 is a external jacketing lower-section cylindrical tension coil spring with a 0.9 mm outside diameter, 304 is an a upper pre-tensioning fixed connection ring or fixing adhesive of the optical fiber and spring, 305 is a lower pre-tensioning fixed connection ring or fixing adhesive of the optical fiber and spring, 306 is a lower non-pre-tensioning fixed connecting ring or fixing adhesive of the 0.9 mm external jacketing cylindrical tension coil spring and optical fiber, 308 is a connection ring or fixing adhesive, which is a non-pre-tensioning fixed connection ring or fixing adhesive on the upper seat ring of the 0.9 mm external jacketing cylindrical tension coil spring and the second low-expansion coefficient spring coiled in a different direction, 309 is a connection ring or fixing adhesive, which is a non-pre-tensioning fixed connection ring or fixing adhesive on the lower seat ring of the 0.9 mm external jacketing cylindrical tension coil spring and the second low-expansion coefficient spring coiled in a different direction, 311 is a total length of second external-loose jacketing low-expansion coefficient spring coiled in a different direction, and 312 is a high-expansion coefficient temperature compensation section with tight initial tension for the temperature compensation of the 0.9 mm external jacketing cylindrical tension coil spring. The structure of the 0.9 mm external jacketing full-cylindrical coil spring for protecting the axial optical fiber and the fiber grating which is formed by the total length of connection between the 0.9 mm external jacketing upper-section cylindrical tension coil spring 301, the external jacketing high-expansion coefficient cylindrical compression coil spring of a 0.9 mm outside diameter 302, and the 0.9 mm external jacketing lower-section cylindrical tension coil spring 303 utilizes the self full-spring-jacketed optical fiber structure pre-tensioning technique in "Self-Tensed and Fully Spring Jacketed Optical Fiber Sensing Structure", which was filed on Jan. 20, 2015 and numbered TW 104101751. The pre-tensing technique is arranging an FBG in a spring composed of a cylindrical tension coil spring and a compression coil spring to form a pre-tensioning stress in an elasticity stretched elastic region, whereby to reduce the size of the large mechanical structure used by the fiber Bragg's grating filter in the prior art and reduce the cost thereof. However, the self spring-jacketed pre-tensioning technique is not claimed in the claims of the present invention. The reason why the coiling direction of the second external-loose jacketing low-expansion coefficient spring 311 (for example, coiled clockwise) is different from that of the first high-expansion coefficient spring (for example, coiled counterclockwise) formed by connecting 301, 302, and 303 in series is to prevent the accidental mutual engagement between the inner and outer cylindrical coil springs combined concentrically as the result of incorrect operation and achieve the objective of balance control on torsion caused by the difference between increases or decreases in the lengths of the inner and outer springs when temperature change.

According to a fiber Bragg's grating pre-tensioning effect among two main temperature compensated effects of the present invention, the section of external jacketing high-expansion coefficient cylindrical compression coil spring of a 0.9 mm outside diameter f 302 between the 0.9 mm external-diameter external jacketing upper-section cylindrical tension coil spring 301 and the 0.9 mm external jacketing lower-section cylindrical tension coil spring 303 is compressed at first, and the fiber Bragg's grating in the axis thereof is fixed by fixing the connection ring or fixing adhesive 304 and the connection ring or fixing adhesive 305 for optical fiber and spring pre-tensioning, and then the compression coil spring is released, so that the FBG pre-tensioning effect is completed. The purpose of the a new technology that adopts elastic properties of a spring as a precision measuring material of strain for optical progression is to create a spring structure composed of cylindrical tension coil springs and a compression coil spring, wherein an FBG is arranged in the axis of the compression coil spring, the spring is compressed to fix the gauge length of the FBG therein at first, and the compressed coil spring is then released to achieve the fiber Bragg's grating pre-tensioning effect. The above technology satisfies the technology of the modulus of elasticity by the elastic stretching in an elastic region, and achieves the object of setting a pre-tensioning value by implementing the Hooke's Law by a linear relationship. Thus, the compression spring, while achieving the effect of pre-tensioning the FBG by first fixing the FBG placed therein and then releasing the force applied, also forms a jacket having hardness similar to a steel casing to protect the fragile FBG inserted therein. According to the second effect among the two main temperature compensation effects of the present invention, fiber Bragg's grating-pre-tensioning strain or torsion is released to produce a temperature compensation effect on the difference between thermal expansion coefficients of the structural materials. For example, when temperature rises, the effect is realized by a fixed distance between the fixed connection rings 308 and 309 at both ends of the second external-loose jacketing spring 311 coiled in a different direction, and because its low-expansion coefficient elongation is low, the higher elongation of the whole high-expansion coefficient section formed by 302 connected in series with the high-expansion coefficient temperature compensation section 312 with tight initial tension is limited. This pushes the high-expansion coefficient cylindrical tension coil spring section 312 with tight initial tension toward the section of external jacketing high-expansion coefficient cylindrical compression coil spring of a 0.9 mm outside diameter 302 with the same diameter. Originally, the section of external jacketing high-expansion coefficient cylindrical compression coil spring of a 0.9 mm outside diameter 302 is used to achieve a pre-loading effect, and the FBG has been pre-tensioned. Therefore, the thermal stretching result of the high-expansion coefficient cylindrical tension coil spring section 312 is equivalent to the effect of relief of pre-tensioning of the original preloading, just like the effect of decreasing the refractive index to prevent wavelength change. Since the aforementioned description utilizes a proportional dependency relationship between the internal stress and refractive index of the optical fiber, when temperature rises, if stress or torsion is released, the refractive index can be decreased to compensate the shift of the wavelength of the fiber Bragg's grating filter caused by temperature.

DETAILED DESCRIPTION OF THE PREFERRED EMBODIMENTS

Figure 4:
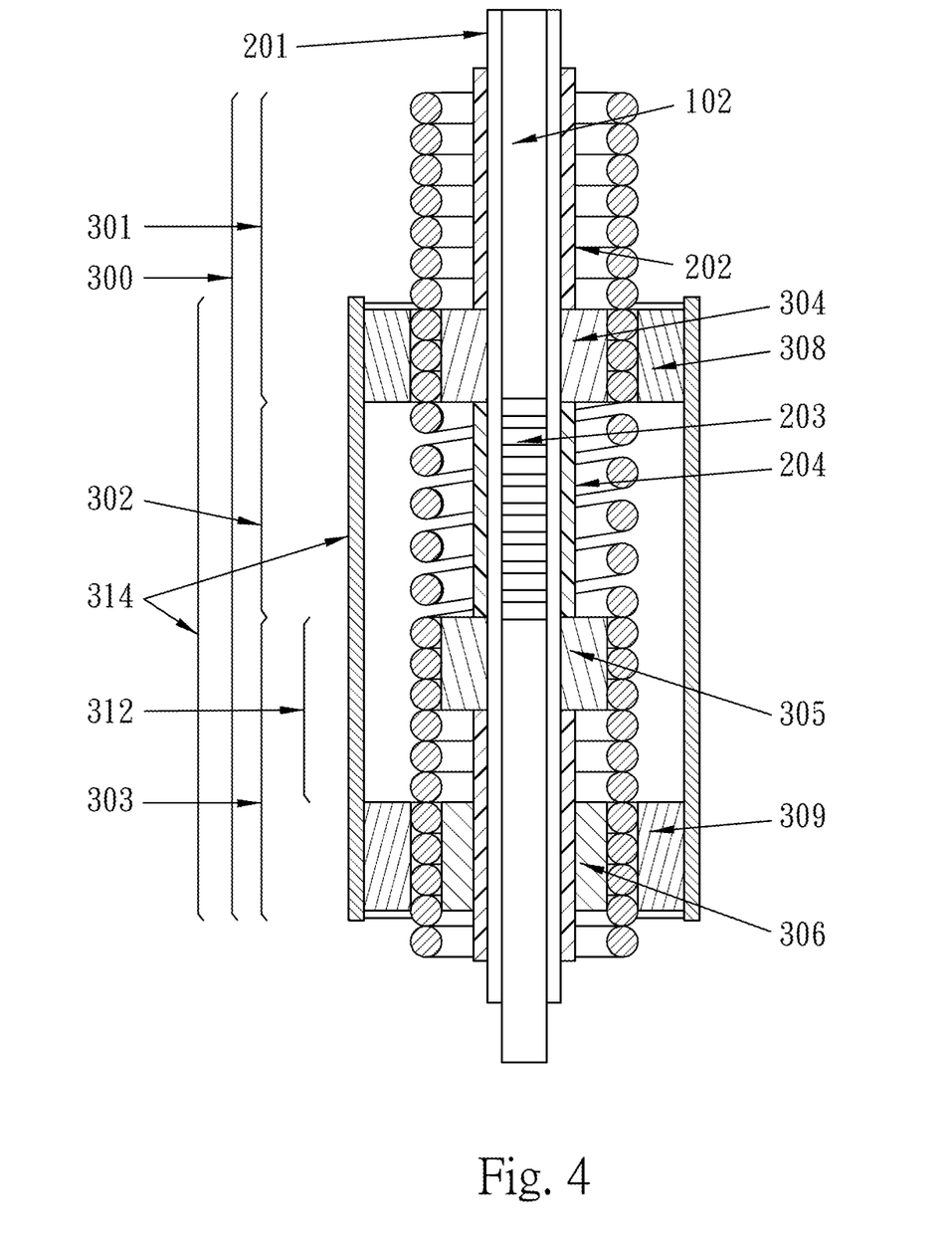
FIG. 4 is a sectional view of a temperature-compensated light wavelength filter loosely jacketed by a low-expansion coefficient outer sleeve.

Embodiment: the structure of a temperature-compensated light wavelength filter loosely jacketed by a low-expansion coefficient outer sleeve.

The structure of a temperature-compensated light wavelength filter with a second low-expansion coefficient loose jacketing spring coiled in a different direction shown in FIG. 3 is used in a environment without moisture and dust pollution. In a moisty and dust-polluted environment, the structure of a temperature-compensated fiber Bragg's grating filter device loosely jacketed by a low-expansion coefficient outer sleeve as shown in FIG. 4. FIG. 4 is a sectional view of the temperature-compensated fiber Bragg's grating filter loosely jacketed by the low-expansion coefficient outer sleeve. The embodiment of the present invention only substitutes an Invar or quartz glass tube as the loose-jacketing low-expansion coefficient outer sleeve 314 for the second loose-jacketing low-expansion coefficient spring structure 311 coiled in a different direction shown in FIG. 3. The Invar or quartz glass tube as the section of loose jacketing low-expansion coefficient outer sleeve 314 with a low-expansion characteristic between two fixed connection rings or fixing adhesives 308 and 309 can limit the higher elongation of the whole high-expansion coefficient section formed by a external jacketing high-expansion coefficient cylindrical compression coil spring of a 0.9 mm outside diameter 302 connected in series with a high-expansion coefficient temperature compensation section 312 with tight initial tension, so that the high-expansion coefficient cylindrical tension coil spring section 312 with tight initial tension is pushed toward the section of the external jacketing high-expansion coefficient cylindrical compression coil spring of a 0.9 mm outside diameter 302 with the same outer diameter. Thereby, the fiber Bragg's grating-pre-tensioning stress or torsion is released, producing a temperature compensation effect on the difference between thermal expansion coefficients of the structural materials. Moreover, the effect can also seal the outer tube to prevent moisture and dust from getting into the internal loose jacketing compression spring, so that the concentrically combined fiber Bragg's grating therein can keep operation normally within an elastic limit In FIG. 4, 102 is an optical fiber core, 201 is a 125 μm bare optical fiber, 202 is a 250 μm outside diameter resin jacketing protection layer, 203 is a 125 μm optical fiber core grating region, 204 is a 250 μm outside diameter resin re jacketing protection layer, 300 is a stainless steel external jacketing high-expansion coefficient cylindrical coil spring, 301 is a 0.9 mm external jacketing upper-section high-expansion coefficient cylindrical tension coil spring, 302 is a external jacketing high-expansion coefficient cylindrical compression coil spring of a 0.9 mm outside diameter, 303 is a 0.9 mm external jacketing lower-section high-expansion coefficient cylindrical tension coil spring, 304 is an upper pre-tensioning connection ring or fixing adhesive of the optical fiber and spring, 305 is a lower pre-tensioning connection ring or fixing adhesive of optical fiber and spring, 306 is a lower non-pre-tensioning connecting ring or fixing adhesive of the 0.9 mm external jacketing cylindrical tension coil spring and optical fiber, 308 is a connection ring or fixing adhesive, which is a non-pre-tensioning fixed connection ring or fixing adhesive on the upper retainer of the 0.9 mm external jacketing cylindrical tension coil spring and a second-layer external-loose jacketing low-expansion coefficient metal sleeve, 309 is a connection ring or fixing adhesive, which is a non-pre-tensioning fixed connection ring or fixing adhesive on the lower seat ring of the 0.9 mm external jacketing cylindrical tension coil spring and the loose-jacketing low-expansion coefficient outer sleeve made of metal, 314 is the loose-jacketing low-expansion coefficient outer sleeve made of metal, such as an Invar or $SiO_2$ tube, and 312 is a high-expansion coefficient temperature compensation section for the temperature compensation of the 0.9 mm external-jacketing cylindrical tension coil spring with tight initial tension.

According to a fiber grating pretensioning effect among two main temperature compensation effects of the present invention, after the section of external jacketing high-expansion coefficient cylindrical compression coil spring of a 0.9 mm outside diameter 302 between the 0.9 mm external jacketing upper-section external-diameter cylindrical tension coil spring 301 and the 0.9 mm external jacketing lower-section cylindrical tension coil spring 303 is compressed at first and the fiber grating in the axis thereof is fixed by the connection ring or fixing adhesive 304 and the connection ring or fixing adhesive 305 for optical fiber and spring pre-tensioning, the compression coil spring is released, whereby the FBG pre-tensioning effect is complete. Such a pre-tensioning effect is intended to pre-stretch the FBG to form a reserved amount of compression of the grating in a relationship between the stress and strain, which enables operation within the linear elastic region under the tolerable lowest temperature. According to the FBG pre-tensioning effect of the present embodiment, after the external jacketing high-expansion coefficient cylindrical compression coil spring of a 0.9 mm outside diameter 302 with a wavelength presetting gauge length is pre-compressed, the optical fiber and spring pre-tensioning fixed connection rings at both ends i.e. the upper optical fiber and spring pre-tensioning fixed connection ring 304 and the lower optical fiber and spring pre-tensioning fixed connection ring 305 in FIG. 4, are fixed. When the two connection rings are fixed on the uncompressed bare optical fiber 201 in the axis of the compression spring according to a predetermined distance, the compression spring is then released, so that predetermined pretensioning force is obtained, and this is equivalent to the effect of pre-tensioning the FBG in advance on each type of sensing component structure in the prior art.

The maximum tolerable compression strain of the fiber Bragg's grating filter is calculated under the assumption that the fiber Bragg's grating filter can keep a linear relationship when operating temperature decreases to −25° C. Because the wavelength shift of the FBG caused by temperature change is 1 pm per 0.1° C. (1 pm=1×10$^{-12}$ M), when the normal operating temperature of 25° C. decreases to −25° C., the temperature decreases by 50° C. in total, that is the operating wavelength is decreased by about 500 pm (=0.5 nm). When the properties of such a compression spring are designed, calculation is carried out according to the requirement that an amount of pre-compression under −25° C. can be achieved only when the fiber Bragg's grating is pre-tensioned by a wavelength displacement of 0.5 nm under the normal temperature of 25° C. Since the section of the fiber Bragg's grating is pre-tensioned to induce a 0.5 nm wavelength shift amount according to a data relationship of a manufactured fiber Bragg's grating, a force of 80 grams needs to be applied for pre-tensing per 1 nm; the force that needs to be applied on the compression spring is 40 g (=0.04 kg), and P=0.04 kg. While the compressive force applied on the compression spring is released, 40 g of pre-tensioning force can be reversely generated on the FBG A relationship of the gauge length between the two fixed ends of the fiber grating in the cylindrical compression coil spring, the force P that first compressed and then released from the spring to achieve tensing of the fiber grating, and the spring deflection δ of deformation from the force received may be represented by the following equation:

$$\delta = (8nD^3/Gd^4)P \qquad (6)$$

d: Stainless steel wire diameter;
D: Average pitch diameter;
G: Lateral elasticity coefficient; and
n: Effective coil number.

A spring index can be set as c, c=D/d, and thereby Equation (6) can be further expressed by the following equation:

$$\delta = (8nc^3/Gd)P \quad (7)$$

$$= (8nc^4/GD)P \quad (8)$$

The spring index c=D/d can be the basis for selecting the size of the spring structure to design a spring that satisfies various spring outer diameters, spring inner diameters, effective coil numbers, magnitudes of tensing forces, or a maximum tolerable compression stress. The lateral elasticity coefficient represented by G is the stress which is required to make a material produce a unit shear strain, and is a constant value depending on material properties. The deflection of a spring of the same size is inversely proportional to the G value of the material. The spring deflection δ of the spring caused by a load P on the axis of the spring can be worked out by Equation (6). In the present embodiment, it is assumed that n is 50 coils, d=0.3 mm, D=1 mm, P=0.04 kg, and G=7.5×10³ kg/mm² (stainless steel lateral elasticity coefficient). From Equation (6), it is obtained that the deflection δ of the spring caused by the axial load P is δ=0.25 mm. That is, when the compression coil spring is compressed by 0.25 mm, two sealing seat rings at the tension springs located closely at the two ends of the compression coil spring and the optical fiber placed therein are applied with a resin adhesive, which then cures to form connecting rings, and the compression coil spring is then released. Alternatively metal is pressed to form the connection rings and then fixed, and the pre-tensioned compression coil spring is then released. Thus, a force can be applied on the internal fiber grating therein to produce an effect of pre-tensioning by a wavelength shift of 0.5 nm, so that a pre-compression strain within an operating temperature range of about 50° C. is obtained to withstand the maximum tolerable compression strain of the device while the operating temperature decreases to −25° C.

According to the second effect among the two main temperature compensation effects of the present invention, the fiber Bragg's grating-pre-tensioning strain or torsion is released to produce a temperature compensation effect on the difference between thermal expansion coefficients of the structural materials. For example, when temperature rises, the effect is realized by a fixed distance between the fixed connection rings or fixing adhesives 308 and 309 at both ends of the loose-jacketing low-expansion coefficient outside sleeve 314 made of Invar, and because its low-expansion coefficient elongation is low, the higher elongation of the whole high-expansion coefficient section formed by external jacketing high-expansion coefficient cylindrical compression coil spring of a 0.9 mm outside diameter 302 connected in series with the high-expansion coefficient temperature compensation section 312 with tight initial tension is limited. This pushes the high-expansion coefficient cylindrical tension coil spring section 312 with tight initial tension toward the section of external jacketing high-expansion coefficient, to the fiber jacketing cylindrical compression coil cylindrical compression coil spring of a 0.9 mm outside diameter 302 with the same outer diameter.

Originally, the section of external jacketing high-expansion coefficient cylindrical compression coil spring of a 0.9 mm outside diameter 302 is used to achieve a preloading effect, and the FBG has been pre-tensioned. Therefore, the thermal stretching result of the high-expansion coefficient temperature compensation section 312 with tight initial tension is equivalent to the effect of the relief of the pre-tensioning of the original preload, just like the effect of decreasing the refractive index to prevent wavelength change. When temperature rises, if stress or torsion is released, the refractive index can be decreased to compensate the shift of the wavelength of the fiber Bragg's grating filter caused by temperature.

In the present embodiment, both the thermal-compensated light wavelength filter structure with the loose jacketing low-expansion coefficient outer sleeve 314, such as an Invar or SiO2 tube, shown in FIG. 4 and the temperature-compensated light wavelength filter structure with the second low-expansion coefficient loose-jacketing spring coiled in a different direction shown in FIG. 3 can achieve the temperature compensation effect. However, practically, the temperature-compensated light wavelength filter structure with the loose-jacketing low-expansion coefficient outer sleeve 314, such as an Invar or SiO₂ tube, as a second external-loose jacketing layer shown in FIG. 4 not only can prevent moisture and dust pollution, but also can maintain a linear adjustment environment for the first high-expansion coefficient spring therein under a condition of collimation. The thickness of the low-expansion coefficient outer sleeve can be adjusted according to an elongation of the whole high-expansion coefficient section formed by the external jacketing high-expansion coefficient cylindrical compression coil spring of a 0.9 mm outside diameter 302 connected in series with the high-expansion coefficient temperature compensation section 312 with tight initial tension or a fixed distance formed between the positions of connection between the fixed connection rings or fixing adhesives 308 and 309 at both ends of the loose jacketing low-expansion coefficient outer sleeve 314 and the tension springs therein and a difference between two expansion coefficients. The shape of the low-expansion coefficient outer sleeve can also be a round-holed rectangular column which is concentrically co-structured with the optical fiber therein.

Throughout the disclosure of the present invention, various details and reference denotations of elements used in the embodiments are regarded as the same or functionally similar elements. Further, the drawings are kept simple to illustrate main features of the embodiments. It should be noted that, the drawings are not drawn to depict all features of the embodiments, nor they are drawn to relative sizes and quantities of the elements or to true scales. Instead, the drawings are drawn to fully illustrate the fundamental spirit of the fiber Bragg's grating filter, the elements forming the fiber Bragg's grating filter, and the temperature-compensated assembly. One person skilled in the art can easily implement the fiber Bragg's grating filter in various modifications to exercise equivalent functions. For example, in one embodiment, an outer sleeve having a concentrically co-structured round-hole rectangular column shape is selected, and cylindrical compression coil springs having different pitch angles are selected and connected in series to form different combinational structures. Alternatively, a different spring index c may be selected, i.e., c=D/d. Further, in other modifications, different combinations of springs having different outer diameters and wire diameters, and fine-tuning the various manufacturing parameters, such as the lateral elasticity coefficient G of the steel material, can be made, as such modifications are also applied within the scope of the present invention. Thus, applications of the fiber Bragg's grating filter can become more versatile and diversified.

In the disclosure, both the embodiments with the low-expansion coefficient invar or $SiO_2$ tube as the second-layer external-loose jacketing outer sleeve as the temperature-compensated light wavelength filter structure or the embodiment with the second low-expansion coefficient loose-jacketing spring coiled in a different direction described in the specification as the temperature-compensated fiber Bragg's grating filter structure, can diagrammatically describe the structures comprising the temperature compensation effects and elaborate the temperature compensation structures of the present invention. It should be noted that, the above exemplary details and embodiments are not to be construed as limitations to the present invention. In possible implementation, without departing from the spirit of the present invention, modifications and changes can be made to these embodiments of the present invention, and based on the current knowledge and teaching as well as incorporating prior technical features, appropriate modifications can be made to the present invention for different applications or other materials are applied to the present invention. Such variation and modifications are encompassed within the equivalent meanings and range of the appended claims.

What is claimed is:

1. A temperature-compensated fiber Bragg's grating filter, comprising:
    a single-mode optical fiber, comprising a fiber Bragg's grating therein;
    a cylindrical coil spring series assembly formed by a cylindrical compression coil spring connected in series with a cylindrical tension coil spring, the single-mode optical fiber passing through the cylindrical coil spring series assembly, the fiber Bragg's grating in the single-mode optical fiber being arranged in the cylindrical compression coil spring in the cylindrical coil spring series assembly, the fiber Bragg's grating being pretensioned and fixed, and the thermal expansion coefficient of the springs of the cylindrical coil spring series assembly being higher than the thermal expansion coefficient of an outer metal sleeve mentioned below;
    a fixed head-end connection ring or fixing adhesive, the fixed head-end connection ring or fixing adhesive, being fixedly connected with one end of the internal pretensioned fiber Bragg's grating, and the fixed head-end connection ring or fixing adhesive being also fixedly connected with one end of the external cylindrical compression coil spring;
    a fixed tail-end connection ring or fixing adhesive, the fixed tail-end connection ring or fixing adhesive, being fixedly connected with the other end of the internal pretensioned fiber Bragg's grating, the fixed tail-end connection ring or fixing adhesive being also fixedly connected with the other end of the external cylindrical compression coil spring, and the pretensioned fiber Bragg's grating being formed by after the cylindrical compression coil spring is compressed and the fixed head-end connection ring or fixing adhesive and fixed tail-end connection ring or fixing adhesive are fixed, releasing the cylindrical compression coil spring to implement the effect of pretensioning the fiber Bragg's grating therein; and
    an outer metal sleeve, the outer metal sleeve loosely jacketing the cylindrical coil spring series assembly, and both ends in the outer metal sleeve being fixedly connected with both ends of the cylindrical coil spring series assembly arranged therein through the two fixed connection rings or fixing adhesives in a non-pretensioning manner; and the fiber Bragg's grating filter composed of all the components in a concentric co-structuring manner with the axis of the optical fiber, wherein the temperature-compensated fiber Bragg's grating filter is characterized in that the difference between a change in the length of the outer metal sleeve caused by a temperature change and a change in the length of the cylindrical coil spring series assembly arranged therein caused by the temperature change causes a stress-releasing or stress-increasing effect on the pretensioned fiber Bragg's grating in the cylindrical coil spring series assembly arranged therein, so that a structure capable of compensating the wavelength shift of the fiber Bragg's grating filter caused by temperature by increasing or decreasing the refractive index is achieved.

2. The temperature-compensated fiber Bragg's grating filter of claim 1, wherein the cylindrical compression coil spring between both ends of the pretensioned fiber Bragg's grating is connected in series with the cylindrical tension coil spring to form the cylindrical coil spring series assembly arranged in the outer metal sleeve, and the thermal expansion coefficient of the outer metal sleeve is lower than the thermal expansion coefficient of the cylindrical coil spring series assembly arranged therein.

3. The temperature-compensated fiber Bragg's grating filter of claim 1, wherein the outer metal sleeve is a tubular metal sleeve, which is concentrically co-structured with the optical fiber therein.

4. The temperature-compensated fiber Bragg's grating filter of claim 1, wherein the outer metal sleeve is a round-hole rectangular column-shaped metal sleeve, which is concentrically co-structured with the optical fiber therein.

5. A temperature-compensated fiber Bragg's grating filter, comprising:
    a single-mode optical fiber, comprising a fiber Bragg's grating therein;
    a cylindrical coil spring series assembly formed by a cylindrical compression coil spring connected in series with a cylindrical tension coil spring, the single-mode optical fiber passing through the cylindrical coil spring series assembly, the fiber Bragg's grating in the single-mode optical fiber being arranged in the cylindrical compression coil spring in the cylindrical coil spring series assembly and the fiber Bragg's grating being pretensioned and fixed, and the thermal expansion coefficient of the springs of the cylindrical coil spring series assembly being higher than the thermal expansion coefficient of an outer cylindrical coil spring mentioned below;
    a fixed head-end connection ring or fixing adhesive, the fixed head-end connection ring or fixing adhesive being fixedly connected with one end of the internal pretensioned fiber Bragg's grating, and the fixed head-end connection ring or fixing adhesive being also fixedly connected with one end of the external cylindrical compression coil spring;
    a fixed tail-end connection ring or fixing adhesive, the fixed tail-end connection ring or fixing adhesive being fixedly connected with the other end of the internal pretensioned fiber Bragg's grating, the fixed tail-end connection ring or fixing adhesive is also fixedly connected with the other end of the external cylindrical compression coil spring, and the pretensioned fiber Bragg's grating being formed by after the cylindrical compression coil spring is compressed and the fixed head-end connection ring or fixing adhesive and fixed tail-end connection ring or fixing adhesive are fixed, releasing the cylindrical compression coil spring to implement the effect of pretensioning the fiber Bragg's grating therein; and an outer cylindrical coil spring, the outer cylindrical coil spring loosely jacketing the cylindrical coil spring series assembly in different coiling directions, and both ends in the outer cylindrical coil spring being respectively fixedly connected with both ends of the cylindrical coil spring series assembly arranged therein through the two fixed connection rings or fixing adhesives in a non-pretensioning manner; and the fiber Bragg's grating filter composed of all the components in a concentric co-structuring manner with the axis of the optical fiber, wherein the temperature-compensated fiber Bragg's grating filter is characterized in that the difference between a change in the length of the outer cylindrical coil spring caused by a temperature change and a change in the length of the cylindrical coil spring series assembly arranged therein caused by the temperature change causes a stress-releasing or stress-increasing effect on the pretensioned fiber Bragg's grating in the cylindrical coil spring series assembly arranged therein, so that a structure capable of compensating the wavelength shift of the fiber Bragg's grating filter caused by temperature by increasing or decreasing the refractive index is achieved.

6. The temperature-compensated fiber Bragg's grating filter of claim 5, wherein the cylindrical compression coil spring between both ends of the pretensioned fiber Bragg's grating is connected in series with the cylindrical tension coil spring to form the cylindrical coil spring series assembly arranged in the outer cylindrical coil spring, and the thermal expansion coefficient of the outer cylindrical coil spring is lower than the thermal expansion coefficient of the cylindrical coil spring series assembly.

7. The temperature-compensated fiber Bragg's grating filter of claim 6, wherein the cylindrical coil spring is a cylindrical tension coil spring, which is concentrically co-structured with the optical fiber therein.

8. The temperature-compensated fiber Bragg's grating filter of claim 5, wherein the outer cylindrical coil spring is a cylindrical compressed coil spring, which is concentrically co-structured with the optical fiber therein.

* * * * *